March 26, 1957 — H. M. GARSSON — 2,786,250
COMBINATION LOCKING AND RELEASE SLIDER FOR SLIDE FASTENERS
Filed Oct. 13, 1953 — 3 Sheets-Sheet 1

HENRY M. GARSSON
INVENTOR.

BY
ATTORNEY

March 26, 1957     H. M. GARSSON     2,786,250
COMBINATION LOCKING AND RELEASE SLIDER FOR SLIDE FASTENERS
Filed Oct. 13, 1953     3 Sheets-Sheet 3

HENRY M. GARSSON
INVENTOR.

BY

ATTORNEY

United States Patent Office 2,786,250
Patented Mar. 26, 1957

2,786,250

COMBINATION LOCKING AND RELEASE SLIDER FOR SLIDE FASTENERS

Henry M. Garsson, New York, N. Y., assignor to The Elmcroft Corporation, New York, N. Y., a corporation of New York Application October 13, 1953, Serial No. 385,797

15 Claims. (Cl. 24—205.14)

This application relates to slide fasteners, in which two rows of interlocking fastener elements, each attached to a tape are employed, and is particularly directed to a slider for use in conjunction with such slide fasteners.

The application is directed to a combination slider which may be locked in any position relative to the slide fastener elements to lock the slider.

This application is primarily directed to a slider equipped with a positive locking mechanism, and a key for use in conjunction with the locking mechanism, to enable an operator to lock the slider relative to the slide fastener elements in any desired position relative to the slide fastener elements, in such a manner as to prevent the operation of the slider without the use of a special type of key provided therefor.

It is further directed to a slider in which the channel plates, guiding the slide fastener elements, may be readily partially opened or will automatically separate to a great enough extent in order to release the slide fastener elements to enable an operator to readjust the slide fastener elements, if they are jammed for any reason as when foreign matter is introduced between the slide fastener elements to prevent their normal operation.

The construction is further directed to a combination slider, which may be readily completely removed from the slide fastener elements to enable a replacement locking slider to be substituted for the conventional type of slider.

This application represents an improvement of my co-pending application for Letters Patent Serial No. 380,530, filed in the United States Patent Office on September 16, 1953, covering a "Slider Locking and Release Mechanism for Slide Fasteners."

The primary object of my invention is to provide a slider for use in conjunction with the conventional type of interlocking slide fastener elements applied to articles of value, in which provision is made for positively locking the slider in such a manner as to prevent the movement of the slider in either direction, relative to the slide fastener elements, thereby preventing the normal operation of the slide fastener elements and maintaining the articles in a locked condition, and to provide in conjunction with the slider, a simple, readily removable key, which is utilized to operate the locking mechanism, and can be readily removed from the slider so as to prevent the opening operation of the locking mechanism until a key of the proper type and configuration is reinserted in its correct position relative to the locking mechanism to permit release of the locking mechanism.

Applicant's construction provides a positive locking mechanism in various forms, which will positively lock the slide fastener elements relative to the slider in any adjusted slider position, to prevent any relative movement therebetween, when the slider is locked, the locking mechanism being controlled by a removable key, which prevents tampering with or releasing the slide fastener elements until the proper key is restored to its operative position.

Another feature of the invention resides in providing a slider fitted with a removable control key, which is adapted to rotate a positive locking member in one of several forms and types, the locking member, when applied to the slide fastener elements in the locking position being so constructed as to lodge between adjacent slide fastener elements, thereby preventing any relative movement between the slider and the slide fastener elements, thus retaining the slide fastener elements in their locked position relative to the slider at any desired point along the chain of slide fastener elements. Various types of locking mechanism are provided to adequately lock slide fastener elements of various sizes and interlocking forms.

Another object is to provide a slider for interlocking slide fastener elements, the slide fastener element guiding channel plates of which will automatically readily separate far enough to enable the slider to be moved relative to the slide fastener elements, when they become jammed for any reason, and to enable the operator to release the slide fastener elements and remove any foreign matter, which may become lodged between the slide fastener elements, and in that manner prevent the normal operation thereof, the partial opening mechanism being provided in conjunction with the locking apparatus.

Applicant provides a positive locking mechanism, which may be utilized to lock the slider in any desired position relative to the slide fastener elements, the locking mechanism being fitted to slider channel plates which guide the slide fastener elements, the slider channel plates being so constructed that they will automatically separate to the required degree, or in which the channel plates may be separated by the operator to a great enough extent to allow the fastener elements to be realigned and adjusted into their normal operating position if they become jammed for any reason.

Another feature of the invention resides in the provision of several types of positive locking mechanism, a portion of each of which is operative to lodge between adjacent slide fastener elements to prevent any movement of the slider relative to the fastener elements, or of the slide fastener elements relative to the slider, the selection of the particular type of locking mechanism depending upon the size of the slide fastener elements with which the slider is used and the article to which said slide fastener elements are applied.

Another feature of the invention resides in the provision of a spring type latching mechanism, which retains the fastener element locking device in the locking position until a key of the proper type and configuration is inserted, to release the spring latch in order to enable the locking mechanism to be rotated into the slide fastener element operating position.

Another feature resides in the provision of various types of key configuration and mating openings therefor, to enable a wide degree of selectivity to be obtained between the key and its mating control elements in the slider and locking mechanism construction. This enables a wide range of slider and key combinations to be employed, the basic construction of the locking mechanism remaining essentially the same.

It will be understood that the following description of the construction and method of operation of the combination locking and release slider for slide fasteners is intended as explanatory of the invention and not restrictive thereof.

In the drawings, the same reference numerals designate the same parts throughout the various views, except where otherwise indicated.

Figures 1, 2, 3, 4, 6, 10, 26:
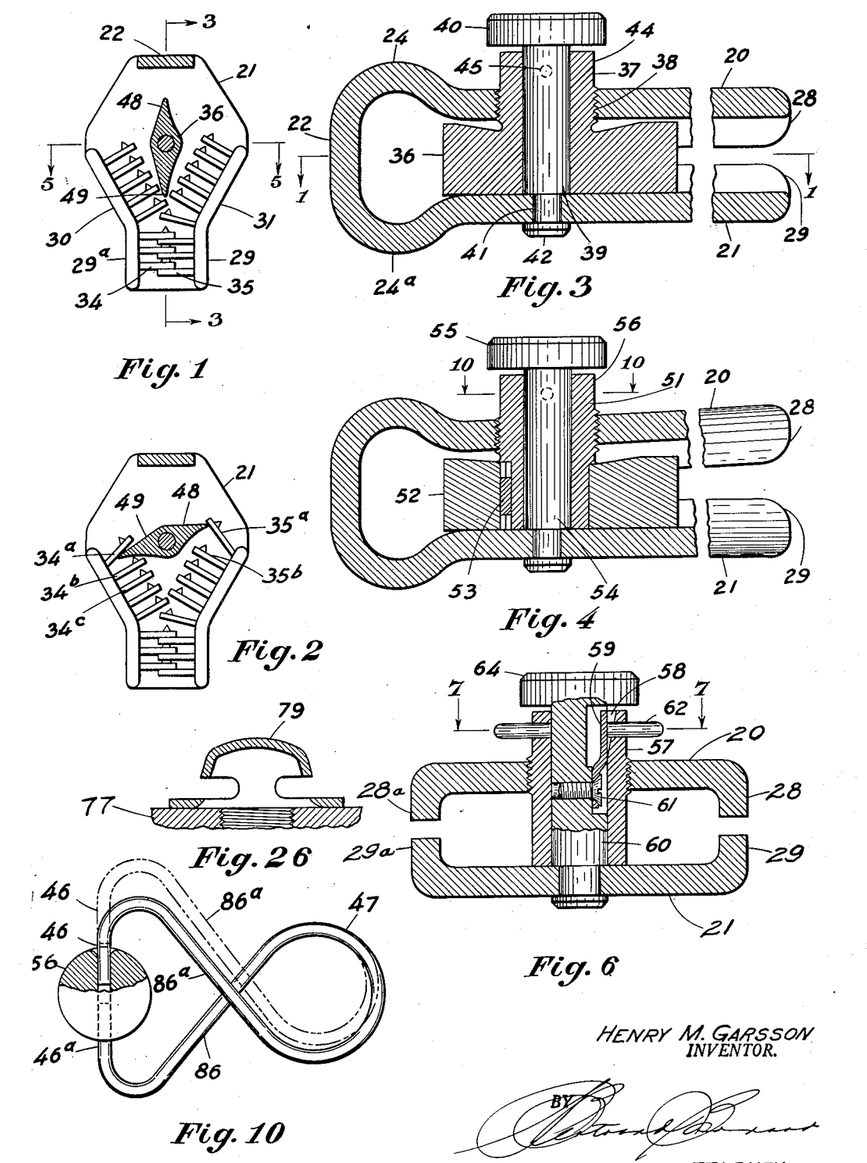
Fig. 1 represents a schematic cross-section through one embodiment of the slider with the upper channel plate of the one-piece channel plate construction removed, and a plan view of the slide fastener elements, showing one embodiment of the slide fastener element locking wedge in its operating position, to enable the slider to be readily moved relative to the slide fastener elements in its normal manner, taken at 1—1, Fig. 3.
Fig. 2 represents a schematic cross-section similar to Fig. 1, through the slider, with the slide fastener element locking wedge of the type shown in Figs. 1 and 3, rotated into the fastener element locking position, the tapered tips of the locking wedge being lodged between adjacent slide fastener elements, thus preventing any movement of the slider relative to the slide fastener elements, and positively locking the slider relative to the slide fastener elements.
Fig. 3 is a vertical section through the one-piece spring type channel plates, shown in Fig. 1, showing one embodiment of the locking wedge in its operating position relative to the slide fastener elements, also the hollow wedge support member, and the central cylindrical shaft, taken at 3—3, Fig. 1.
Fig. 4 is a vertical section through the one-piece slider channel plates, shown in Fig. 3, with the upper channel plate moved out of its normal position, relative to the lower channel plate, to permit adjustment of the slide fastener elements, also a modification of the locking wedge, shown in Fig. 3, and the method of attaching the locking wedge to a cylindrical wedge support member mounted at the center thereof.
Fig. 6 is a cross-section through the slider channel plates and the locking wedge and the tubular wedge support member, shown in Fig. 5, with the operating prongs of a key inserted through the head of the tubular wedge support member to move the spring latch out of engagement with the tubular wedge support member, taken at 6—6, Fig. 7.
Fig. 10 is a cross section through the head of the hollow wedge support member, shown in Fig. 4, and a plan view of a key similar to that shown in Fig. 9, with the prongs of the key inserted through openings in the wedge support member head, showing in dot-dash lines the position of the key when the prongs are removed from the wedge support member head openings, taken at 10—10, Fig. 4.
Fig. 26 is a vertical section through the locking wedge support shaft cover, shown in Fig. 11, taken at 26—26, Fig. 11.

One embodiment of the slider construction, shown in Figs. 1, 2 and 3, comprises an upper and a lower channel plate 20 and 21, formed of a single sheet of spring material, the rear end of the channel plates being connected by an integral neck 22, the rear section of each of the channel plates being integrally connected to the neck 22 by a connecting section 24 or 24a of arcuate cross-section, as indicated in Fig. 3, the arcuate connecting section enhancing and regulating the spring action of the slider channel plates.

In their normal operating position, the flat plate sections of the channel plates are held substantially parallel to one another in the position shown in Fig. 3, the spring action of the material of which the plates are made, the neck section and the arcuate connecting section thereof restoring the channel plates to this position when they are canted or otherwise displaced for any reason.

As indicated in Figs. 1, 2 and 3, and 6, each channel plate has a pair of flanges 28 and 28a, or 29 and 29a integral therewith, the flanges being substantially perpendicular to the flat plate section of the respective channel plates, as indicated in Fig. 6.

The lower portion of the flanges 28, 28a, and 29, 29a are substantially parallel to one another, as indicated in Figs. 1 and 2, to guide the slide fastener elements when they are in the interlocked position.

Above the parallel portion of each of the flanges an integral sloping section 30 or 31 is incorporated with each of the flanges, the angular position of the sloping section of each of the flanges being controlled by the angular position required to disengage the fastener elements 34 and 35, at opposite sides of the slider, or guide the fastener elements into their interlocking position relation to one another, depending upon the direction the slider is moved relative to the slide fastener elements, the slide fastener elements 34 or 35, on each side being attached to an individual tape (not shown) in the conventional manner.

Figures 5, 7, 8, 9, 11, 12, 13, 14, 15:
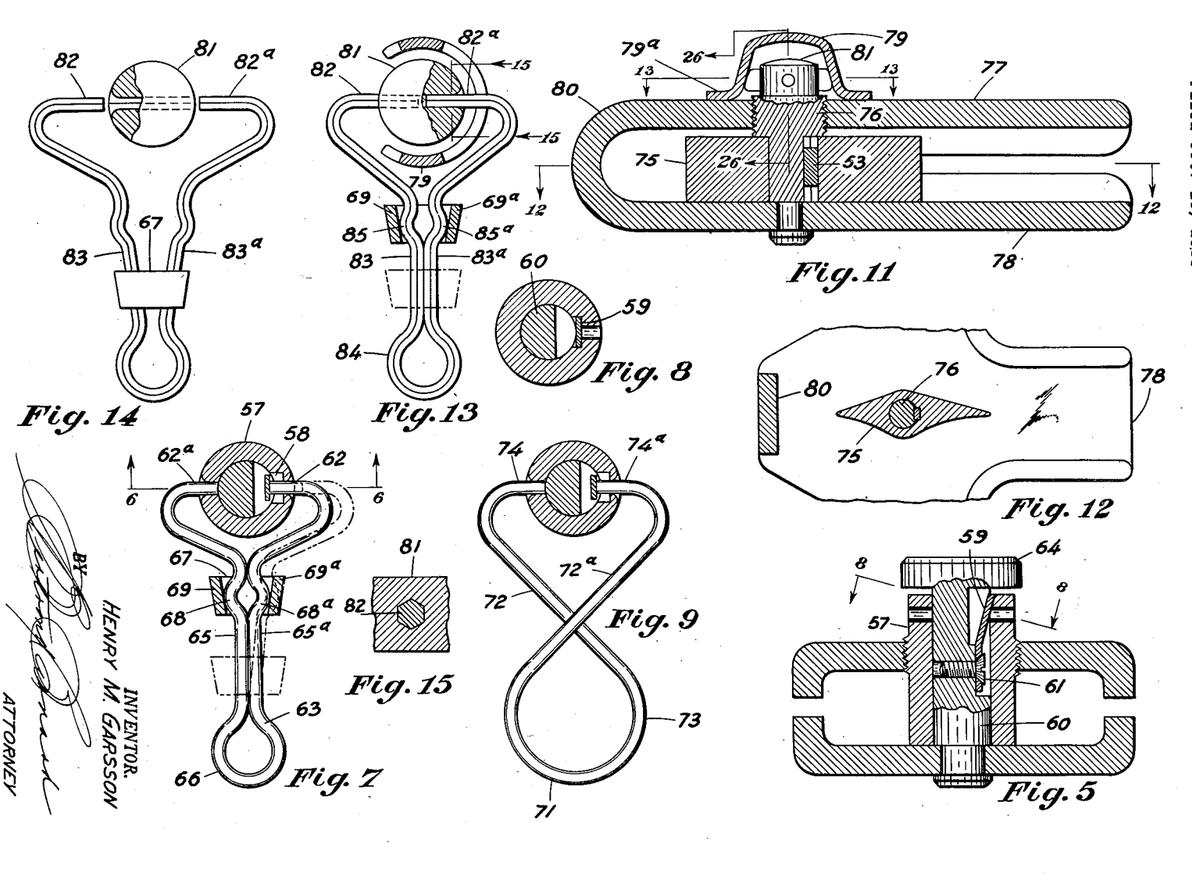
Fig. 5 is a vertical section through the slider channel plates, shown in Fig. 1, and a modification of the slide fastener element locking wedge, shown in Fig. 3, also a tubular locking wedge support member and a central wedge support shaft, showing a spring latching mechanism for retaining the locking wedge in its locking position, taken at 5—5, Fig. 1.
Fig. 7 is a cross-section through the head of the tubular wedge support member, shown in Fig. 6, and a plan view of one embodiment of a key used in conjunction therewith, also one of the prongs of the key inserted through the openings in the tubular support member to move the spring latch into the unlatched position, shown in Fig. 7, taken at 7—7, Fig. 6.
Fig. 8 is an angular cross-section through the upper end of the tubular wedge support member, shown in Fig. 5, showing the relation of the latch spring in its latching position to the channel cut into the top of the tubular wedge support member, taken at 8—8, Fig. 5.
Fig. 9 is a cross-section, similar to Fig. 7, through the upper end of the tubular wedge support member, and a plan view of a modification of the key, shown in Fig. 7, with one of the prongs of the modified key engaging the latch spring to move the latch spring into its unlatched position relative to the tubular wedge support member channel.
Fig. 11 is a vertical section similar to Fig. 3, through a modification of the slider locking mechanism, fitted with a solid cylindrical wedge support member, and a locking wedge attached to the body of the solid wedge support member.
Fig. 12 is a cross-section through the locking wedge and the solid wedge support member, shown in Fig. 11, taken at 12—12, Fig. 11.
Fig. 13 is a partial cross-section through the head of the locking wedge support member, shown in Fig. 11, and a plan view of a spring type of key, fitted to the head of the locking wedge support member, similar to that shown in Fig. 7, taken at 13—13, Fig. 11.
Fig. 14 is a plan view and partial cross-section, similar to Fig. 13, of the head of the wedge support member, and the spring type of key with the key control slide moved downward to allow the prongs of the key to clear the openings in the locking wedge support member head.
Fig. 15 is a cross-section through the wedge support member head and one prong of the key shown in Fig. 13, showing one cross-sectional configuration of the key and the head opening to match the key to the head opening, taken at 15—15, Fig. 13.
Figures 17, 19:
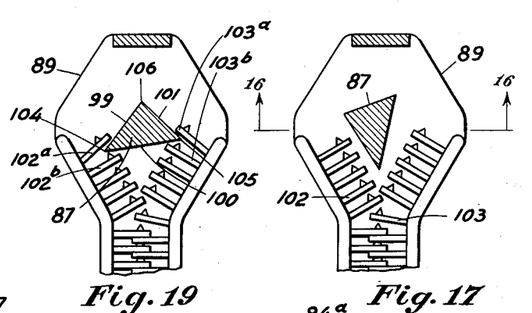
Fig. 17 is a cross section through the triangular locking wedge, shown in Fig. 16, with the locking wedge located in the operating position, relative to the lower channel plate and the slide fastener elements, taken at 17—17, Fig. 16.
Fig. 19 is a schematic cross-section, similar to Fig. 18, with the triangular locking wedge rotated into its locking position, relative to the slide fastener elements, two tapered tips of the locking wedge being lodged between adjacent slide fastener elements to prevent any forward or rearward movement of the slider relative to the slide fastener elements.

A locking wedge 36, which may be made in one of several forms, as indicated in Figs. 1, 12 and 17, is mounted between the upper and lower channel plates 20 and 21, the locking wedge being located between the two rows of interlocking slide fastener elements 34 and 35, as indicated in Fig. 1.

In the construction shown in Fig. 3, the locking wedge 36 is integral with a hollow cylindrical support member 37, the outer circumference of the upper portion of which is threadably fitted to the upper channel plate 20 by means of the external threads 38 formed on the outer circumference thereof.

In the construction shown in Fig. 3, a substantially cylindrical vertical shaft 39 is fitted through a cylindrical opening in the interior of the locking wedge and the integral support member thereof, the shaft retaining the locking wedge in its proper position relative to the upper and lower channel plates. As indicated in Fig. 3, a substantially cylindrical cap 40 may be formed integral with the upper end of the cylindrical shaft 39, the cap being slightly larger in diameter than the head at the upper end of the hollow wedge support member, to partially cover the prongs of a key which are inserted therein, in a manner hereinafter described in greater detail.

The lower end of the vertical shaft 39 is reduced in diameter 41, as indicated in Fig. 3, the reduced diameter being fitted through an opening in the lower channel plate 21, to fix the shaft relative to the lower channel plate. A head 42 may be formed on the lower end of the reduced diameter section of the shaft to grip the lower channel plate. A flat, or slot may be formed on the reduced diameter section of the shaft 39 to maintain the shaft in fixed relation to the lower channel plate.

The locking wedge may be made in other contours, as shown in Figs. 1, 12 and 17, and may be fixed to its support member, as indicated in Fig. 4, the operation of the locking wedge relative to the slide fastener elements being substantially the same.

The detailed coordination of the various constructions of the locking wedge and the related parts thereof will be described hereinafter in greater detail.

In the locking wedge support construction, shown in Fig. 3, a substantially cylindrical hollow head 44, is formed integral with the upper end of the hollow locking wedge support member, an opening 45 being cut through each of the walls of the head in a direction perpendicular to the longitudinal shaft axis, to receive the control prongs 46 of a spring type of key 47, such as that shown in Fig. 10, or the prongs of a modified spring type of key, such as that shown in Figs. 7 and 13.

The key prongs 46 are inserted into the openings 45 in the hollow cylindrical support member head by sliding the inner ends of the key prongs 46 and 46a around the outer circumference of the head 44 integral with the hollow wedge support member, below the cap 40, integral with the cylindrical shaft 39.

As indicated in Figs. 1 and 2, the locking wedge, which is integral with the cylindrical support member thereof, is formed with two diametrically opposite tapered tips 48 and 49, the lower tapered tip 49, Fig. 1, being slightly longer than the upper tapered tip.

In the triangular locking wedge construction, shown in Figs. 17 and 19, there are three tips or corners of the triangle of varying included angle, the two lower tips in the construction shown in Fig. 19, functioning in substantially the same manner as the diametrically opposite tips, shown in Fig. 3. The operation of the triangular locking wedge construction will hereinafter be described in greater detail.

The left-hand edges, Fig. 1, of the tapered tips 48 and 49 of the locking wedge 36, shown in Figs. 1 and 2, are relatively straight, sloping from the outer circumference of the locking wedge hub to each of the tips thereof. The straight edges are shown in the upper position when the locking wedge 36 is rotated into the locking position, shown in Fig. 2.

The right-hand edges of the tapered tips 48 and 49 of the locking wedge, shown in Fig. 1, are either relatively straight, similar to the left-hand edges or are of concave arcuate contour, as indicated in Figs. 1 and 2, the contour of the right-hand edges, Fig. 1, being controlled by the angle required between the longitudinal locking wedge axis and the edges of the tapered tips in order to lock the slide fastener elements, when the locking wedge is rotated into the locking position, shown in Fig. 2.

When the locking wedge 36 is located in the operating position, shown in Fig. 1, the lower tapered tip 49 is located between the two rows of slide fastener elements 34 and 35, thus permitting free movement of the slide fastener elements and thereby allowing the slide fastener elements to be interlocked and disengaged in the conventional manner.

When the locking wedge 36 is rotated into the slide fastener element locking position, shown in Fig. 2, by means of the key 47, or a similar key, the longer left-hand tapered tip 49 lodges between two adjacent slide fastener elements 34a and 34b, the sloping upper edge of the left-hand locking wedge tip 49, Fig. 2, forcing the upper slide fastener element 34a out of its normal position, substantially perpendicular to the tape, the sloping or concave arcuate lower edge of the tapered tip 49 forcing the adjacent slide fastener element 34b out of its normal position, substantially perpendicular to the tape, thereby positively preventing any forward or rearward movement of the slider relative to the slide fastener elements, or of the slide fastener elements relative to the slider, and positively locking the slider in its position relative to the slide fastener elements.

The angularly displaced position of the upper left-hand fastener element 34a and the similarly angularly displaced position of the adjacent lower left-hand slide fastener element 34b, forced by their engagement with the adjacent edges of the tapered locking wedge tip 49, restrain any movement of the slide fastener elements, relative to the slider, while the locking wedge is in the locking position, shown in Fig. 2. In addition to angularly displacing the lower left-hand slide fastener element 34b, relative to the tape, due to the pressure of the sloping lower edge of the tapered wedge tip 49, the lower left-hand slide fastener element 34b engages the adjoining slide fastener element 34c, thereby forcing the adjoining slide fastener element 34c out of its normal position relative to the tape, this angular displacement continuing through several slide fastener elements, the number of slide fastener elements displaced depending upon the length of the left-hand tapered tip of the locking wedge, and the included angle between the sloping upper and lower edges thereof. The angular displacement of a series of slide fastener elements 34a, 34b and 34c at the left-hand side, Fig. 2, prevents any movement of the slide fastener elements relative to the slider, thereby positively locking the slider relative to the slide fastener elements in any desired position until the locking wedge is again rotated into the operating position, shown in Fig. 1.

While the left-hand tapered tip 49 of the locking wedge, Fig. 2, angularly displaces the adjoining left-hand slide fastener elements 34a and 34b relative to the tape, the right-hand tapered tip 48 engages the adjoining right-hand slide fastener elements 35, the point of the right-hand tapered tip, or the upper edge of the right-hand tapered tip 48, Fig. 2, engaging the adjacent right-hand slide fastener element 35a, thereby angularly displacing the right-hand slide fastener element 35a relative to the tape, and in that manner assisting in locking the slide fastener elements relative to the slider and preventing any forward or rearward movement of the slider, relative to the slide fastener elements in the interlocking or disengaging direction.

Depending upon the angular position of the tapered locking wedge tips 48 and 49 relative to the slide fastener elements, and the slope of the upper and lower edges of the right-hand tapered tip 48, Fig. 2, additional slide fastener elements 35 on the right-hand side, Fig. 2, may also be angularly displaced relative to the tape, either by direct contact with the sloping lower edge of the right-hand tapered tip 48, or by angular displacement due to contact with the other adjacent slide fastener elements, in direct engagement with the sloping lower edge of the right-hand tapered tip 48.

This further assists in locking the slide fastener elements 34 and 35 relative to the slider, and positively prevents any movement of the slider relative to the slide fastener elements, thereby retaining the slide fastener elements in their locked position until the locking wedge is rotated into the operating position, shown in Fig. 1, relative to the slide fastener elements.

The reduced diameter lower end of the cylindrical shaft 39, shown in Fig. 3, which fits through the opening in the lower channel plate 21, may have one or more flats formed thereon, or may be of hexagonal or other regular polygonal cross-sectional contour, the opening through the lower channel plate 21 being of a mating contour to retain the cylindrical shaft 39 in a fixed position, relative to the lower channel plate, and prevent rotation of the cylindrical shaft 39, when the locking wedge 36 is rotated by means of the key 47, or other type of key.

In a modification of the construction, shown in Fig. 4, a tubular locking wedge support member 51 is substituted in place of the integral locking wedge support member shown in Fig. 3, the outer diameter of the lower portion of the tubular locking wedge support member being reduced below that of the threaded upper section thereof, a locking wedge 52, the form and cross-sectional contour of which is substantially the same as that shown in Figs. 1 and 2, being pressed on, or otherwise attached to the reduced diameter lower section of the tubular locking wedge support member 51.

A key 53 of square, rectangular, or other suitable cross-section may be inserted in a keyway cut into the outer circumference of the reduced diameter section of the locking wedge support member and a mating keyway cut into the central opening in the locking wedge 52, to retain the locking wedge in alignment with the tubular wedge support member and enable the locking wedge to be rotated by means of a spring type of key, the prongs of which fit into diametrical openings through the walls of the head of the locking wedge support member, in the manner shown in Fig. 3, and hereinbefore described.

A pin, or other suitable locking means may be inserted through the locking wedge and the tubular wedge support member in place of the key 53.

A cylindrical vertical shaft 54 is fitted through the circular opening in the tubular wedge support member 51 to align the tubular wedge support member with the upper and lower channel plates 20 and 21, as indicated in Fig. 4. A substantially cylindrical cap 55 is formed integral with the upper end of the cylindrical shaft 54, the cap 55 being slightly larger than the outer diameter of the hollow head 56 integral with the upper end of the tubular wedge support member to cover the head of the tubular wedge support member and a portion of the prongs of a spring type of key, which are inserted therein, in the same manner as that shown in Fig. 3, and hereinbefore described.

The reduced diameter lower end of the cylindrical shaft 54 is fitted through an opening in the lower channel plate 21, a head being formed integral with the lower end of the reduced diameter section, to fix the cylindrical shaft 54 relative to the lower channel plate in substantially the same manner as that shown in Fig. 3, and hereinbefore described.

As indicated in Fig. 4, the upper portion of outer circumference of the tubular locking wedge support member 51 is threadably fitted to the upper channel plate 20, in the same manner as that shown in Fig. 3, a hollow cylindrical or other form of head 56, integral with the upper end of the tubular locking wedge support member having aligned openings through the outer wall thereof, in a plane perpendicular to the locking wedge support member longitudinal axis, to receive the prongs 46 of a spring type of key 47 in the same manner as that shown in Fig. 3 and 10.

In another modification of the locking wedge construction, shown in Figs. 5, 6, 7 and 8, a tubular locking wedge support member 57 is substituted in place of the hollow cylindrical wedge support member, shown in Fig. 3, the locking wedge being integral with the locking wedge support member 57 in the manner shown in Fig. 3, or attached to the tubular wedge support member in the manner shown in Fig. 4.

An angular slot or channel 58, of rectangular, or other suitable cross-section is cut into the upper end of the interior of the tubular wedge support member 57 to receive the upper end of a plate latch spring 59, attached to the central vertical shaft 60, by means of a screw 61, or other suitable attaching means, in the manner shown in Figs. 5 and 6, the latch spring preventing the rotation of the tubular wedge support member 57 about the central shaft 60, when the latch spring is in the latching position, shown in Fig. 5. A groove or channel is cut through the upper portion of the central cylindrical shaft 60, to receive the latch spring 59, and allow the upper portion of the latch spring to move from the latching position, shown in Fig. 5, to the unlatched or free position, shown in Fig. 6, with the upper end of the latch spring free of the outer circumference of the cylindrical shaft 60, when the upper end of the latch spring is moved out of the angular channel 58 in the tubular locking wedge support member by the adjacent prong 62 of a key 63, such as that shown in Fig. 7, when the key prongs are inserted through diametral openings cut through the upper end of the tubular wedge support member in the position shown in Figs. 6 and 7.

As indicated in Figs. 5 and 6, a substantially cylindrical cap 64 is formed integral with the upper end of the cylindrical shaft 60 above the groove cut through the cylindrical portion thereof, the cap 64 being slightly larger in diameter than the outer diameter of the upper end of the tubular wedge support member, to cover the upper end of the tubular wedge support member and the upper end of the latch spring 59, attached to the cylindrical shaft 60.

The upper portion of the tubular wedge support member 57, above the locking wedge, is threadably fitted to the upper channel plate 20, to enable the locking wedge support member to raise the upper channel plate from its normal position, substantially parallel to the lower channel plate 21, as indicated in Fig. 3, to an angular position relative to the lower channel plate, as indicated in Fig. 4, to enable the channel plates to be removed from the slide fastener elements in a manner hereinafter described in greater detail.

The lower end of the cylindrical shaft 60 is reduced in diameter, in a manner similar to that shown in Fig. 3, the reduced diameter section being fitted through an opening in the lower channel plate 21, to retain the cylindrical shaft in permanent alignment with the lower channel plate, a head integral with the reduced diameter lower end of the cylindrical shaft 60 engaging the bottom of the lower channel plate to retain the cylindrical shaft in engagement with the lower channel plate.

One embodiment of the key 63, shown in Fig. 7, which is utilized to move the latch spring 59 out of engagement with the tubular wedge support member, and to rotate the tubular wedge support member 57 and the locking wedge fixed thereto, about the central shaft 60, comprises a pair of substantially parallel legs 65 and 65a, formed of spring wire of circular or other suitable cross-section, the lower end of the legs being connected by a circular or arcuate loop 66, which normally springs the legs 65 and 65a angularly outward into the free position shown by dot-dash lines, Fig. 7, the prongs 62 and 62a of the key, which are connected to the upper ends of the legs 65 and 65a, respectively, by a pair of integral angular connecting sections, each of which has an integral arcuate portion thereof connecting the angular section with the corresponding prong 62 or 62a, the prongs being substantially perpendicular to the legs 65 and 65a of the key, when they are inserted through the openings in the tubular wedge support member, in the operating position, shown in Fig. 7.

In place of the substantially circular cross-section, shown in Fig. 7, the key prongs may be formed of hexagonal, or other regular polygonal cross-section, such as that shown in Figs. 13 and 15, to tie the key into the corresponding opening in the tubular wedge support member head, in a manner hereinafter described in greater detail.

A key control slide 67 is fitted to the parallel legs 65 and 65a of the key 63, shown in Fig. 7, the key control slide being of substantially rectangular hollow cross-section to clear the legs of the key. Each of the legs 65 and 65a of the key has an arcuate protuberance 68 or 68a integral therewith, adjacent the upper end thereof, to engage the inner walls of the key slide 67, used for moving the key legs into the parallel position, shown in Fig. 7. The key control slide 67 has a pair of sloping side walls 69 and 69a integral therewith, the inner edges of the side walls 69 and 69a engaging the legs 65 and 65a of the key and the arcuate protuberances 68 and 68a formed at the upper end of the keys 65 and 65a, from the angularly separated position, shown by dot-dash lines, Fig. 7, to the parallel position, shown in Fig. 7, after the prongs 62 and 62a of the key are inserted through the openings in the tubular wedge support member wall.

In place of the protuberances 68 and 68a, shown in Fig. 7, the upper portion of the legs 65 and 65a of the key may be flattened out, the outer edge of each of the legs 65 and 65a sloping outward from the lower end thereof to the upper end. The inner surface of the side walls 69 and 69a of the key slide 67, when the slide is moved into the upper position, shown in Fig. 7, would press against the wide flattened upper end of the legs 65 and 65a of the key, thus moving the key legs into the parallel operating position, shown in Fig. 7.

The key prongs are pivoted within the openings in the tubular wedge support member to enable an operator to grip the legs of the key or the loop 66 at the lower end thereof, in order to move the slider rearward or forward, relative to the slide fastener elements to interlock or disengage the fastener elements 34 and 35, when the locking wedge is in the operating position, Fig. 1.

In a modification of the key construction, shown in Fig. 9, the key 71, which is formed of spring wire of circular or other suitable cross-section, has a pair of crossed angular legs 72 and 72a, the lower end of which is connected by a loop 73 of arcuate contour, which normally retains the key in the released position, shown in dot-dash lines, Fig. 10, with the prongs 74 and 74a thereof out of engagement with the openings in the tubular wedge support member outer wall.

The upper ends of the angular legs 72 and 72a of the key are connected to the prongs 74 and 74a, which are substantially perpendicular to the longitudinal axis of the key, by a pair of integral arcuate connecting sections, which are integral with the legs and the prongs respectively.

The prongs 74 and 74a of the key 71, shown in Fig. 9, may be of circular cross-section or of hexagonal, or other regular polygonal cross-section, such as those shown in Figs. 13 and 15, to identify the key prong cross-section with the openings in the tubular wedge support member wall, thereby definitely tying a key of a particular prong cross-section to a particular slider.

In another modification of the locking wedge construction, shown in Figs. 11 and 12, the locking wedge 75 is attached to the lower portion of a substantially cylindrical central wedge support shaft 76, the upper end of which is threadably fitted to the upper channel plate 77 of the slider, in the manner shown in Fig. 11.

The reduced diameter lower end of the central wedge support shaft 76, is trunnioned in the lower channel plate 78, a head integral with the reduced diameter lower end of the central support shaft, retaining the lower channel plate in engagement with the central wedge support shaft, while permitting the central wedge support shaft to rotate.

As indicated in Figs. 11 and 26, a cover 79 is mounted above the head of the cylindrical locking wedge support shaft 76. The cover 79, which may be formed of thin sheet material, comprises an upper cover section of arcuate cross-sectional contour, with an integral substantially circular outer wall depending therefrom, in the manner shown in Fig. 11. The inner surface of the upper section of the cover clears the top of a cylindrical head integral with the upper end of the cylindrical locking wedge support shaft 76, the outer wall of the cover being large enough in diameter to clear the outer circumference of the locking wedge support shaft head. As indicated in Fig. 11, a flat flange 79a of circular contour is integral with the lower end of the outer wall of the cover 79, the flange being attached to the upper channel plate 77 by means of rivets, or other suitable attaching means, or the flange 79a may be spot-welded, brazed or otherwise attached to the upper surface of the upper channel plate 77.

The outer wall of the cover 79 has a pair of slots therethrough, as indicated in Fig. 11, the slots clearing the prongs of a key, such as that shown in Fig. 13, inserted in the head of the locking wedge support shaft, when the locking wedge is rotated through an angle from the operating position, shown in Figs. 1 and 12, to the slide fastener element locking position, shown in Fig. 2, the slots in the cover outer wall being wide enough to allow the key prongs to move through the angle necessary to rotate the locking wedge support shaft 76 from the operating position, to the fastener element locking position, Fig. 2.

A key 53 of square, rectangular, or other suitable cross-section is fitted into a keyway cut into the central support shaft and a mating keyway cut into the locking wedge opening.

The upper and lower channel plates 77 and 78, shown in Fig. 11, are similar to those shown in Fig. 3, and hereinbefore described. The channel plates 77 and 78 are formed of a single sheet of strip material, an integral neck 80, of arcuate sectional contour, connecting the rear end of the upper and lower channel plates. The channel plate flanges are substantially the same as those shown in Figs. 1 and 2 and hereinbefore described. The arcuate connecting sections connecting the channel plates with the rear link, shown in Figs. 3 and 4, are eliminated in the construction, shown in Fig. 11.

A substantially cylindrical head 81 is formed integral with the upper end of the central wedge support shaft 76, Fig. 11, the head 81 having an opening therethrough, substantially perpendicular to the longitudinal central support shaft axis to receive the prongs 82 and 82a of a key, shown in Figs. 13 and 14.

In a modification of the key construction, shown in Figs. 13 and 14, the prongs 82 and 82a, which are substantially perpendicular to the longitudinal key axis, fit into a diametral opening of corresponding cross-sectional contour cut through the head 81 of the central locking wedge support shaft 76, shown in Fig. 11.

The prongs 82 and 82a of the key may be of hexagonal or other regular polygonal cross-section, such as that shown in Fig. 15, the opening in the head 81 of the central locking wedge support shaft conforming in cross-section to that of the key prongs in order to identify a particular key with the central wedge support shaft head of a particular slider, thus positively tying the key to a particular slider.

The legs 83 and 83a of the key are substantially parallel to each other in the operating position, shown in Fig. 13. The lower end of the legs 83 and 83a have a loop 84 inetrgal therewith, the spring action of the loop normally angularly spreading the legs of the key in the free position, shown in Fig. 14, so that the inner edges of the key prongs 82 and 82a clear the head 81 of the central locking wedge support shaft to enable the key to be readily removed from the openings in the wedge support shaft head, when the key control slide 67, fitted around the key legs, is moved to the lower position, shown in Fig. 14. Each of the legs 83 and 83a of the key, shown in Figs. 13 and 14, has a convex protuberance 85 or 85a integral therewith, adjacent the upper end thereof, to engage the side walls of the key control slide 67, when the slide is moved into the operating position, shown in Fig. 14.

In place of the protuberances 85 and 85a, shown in Figs. 13 and 14, the upper portion of the legs 83 and 83a of the key may be flattened out, in a manner hereinbefore described, the outer edge of each of the legs 83 and 83a sloping outward toward the upper end thereof. The sloping outer surfaces of the legs would engage the sloping side walls of the key control slide 67, thereby moving the key legs into the parallel position, shown in Fig. 13, when the key control slide 67 is in the upper position. Where key prongs 82 and 82a of hexagonal, or similar cross-section, such as those shown in Fig. 15 are employed, the legs 83 and 83a of the key would be offset to a certain extent in a plane parallel to the upper channel plate of the slider, to a level considerably higher than the openings in the locking wedge support shaft head 81, thereby enabling an operator to grip the key and manipulate the slider in order to interlock or disengage the slide fastener elements in the usual manner.

When the key control slide 67 is moved from the lower position, shown in Fig. 14, to the operating position, shown in Fig. 13, the inner edges of the side walls 69 and 69a of the control slide engage the convex protuberances 85 and 85a at the upper end of the legs of the key, thereby moving the legs of the key into the parallel position, shown in Fig. 13, the prongs 82 and 82a fitting into the openings in the head 81 of the central locking wedge support shaft 76.

In the key construction, shown in Fig. 10, the key prongs 46 and 46a, which are substantially perpendicular to the longitudinal key axis, fit through aligned openings in the wall of the head 56 of the tubular locking wedge support member 51, shown in Fig. 4.

The key 47, which is substantially the same as that shown in Fig. 9, has a pair of crossed angular legs 86 and 86a, the upper ends of which are integral with the prongs 46 and 46a. The lower end of the legs 86 and 86a are connected by a loop of arcuate contour, the spring action of which normally retains the legs 86 and 86a in the operating position, shown in Fig. 10, with the prongs inserted in the openings through the wall of the head of the tubular locking wedge support member 51, Fig. 4.

When the sides of the loop are pressed inward into the position shown by dot-dash lines, Fig. 10, the upper portion of the angular legs 86 and 86a of the key are moved outward, the prongs 46 and 46a being moved out of the openings in the walls of the head 56 of the tubular locking wedge support member, thus enabling the key 47 to be readily removed from the tubular head of the locking wedge support member, when the locking wedge is in the locking position, shown in Fig. 2.

In place of the substantially circular cross-section, shown in Fig. 10, the key prongs 46 and 46a may be of hexagonal, or other regular polygonal cross-section, such as that shown in Figs. 13 and 15, to identify the prongs of a particular key with the openings in the wall of the head of the locking wedge support member, thus providing a means of selection of keys to conform to a particular locking wedge support head wall opening contour.

In another modification of the locking wedge construction, shown in Figs. 16, 17, 18 and 19, a triangular locking wedge 87 is fitted between the upper and lower channel plates 88 and 89 of the slider respectively.

Figures 16, 20, 21, 22, 23, 24, 25:
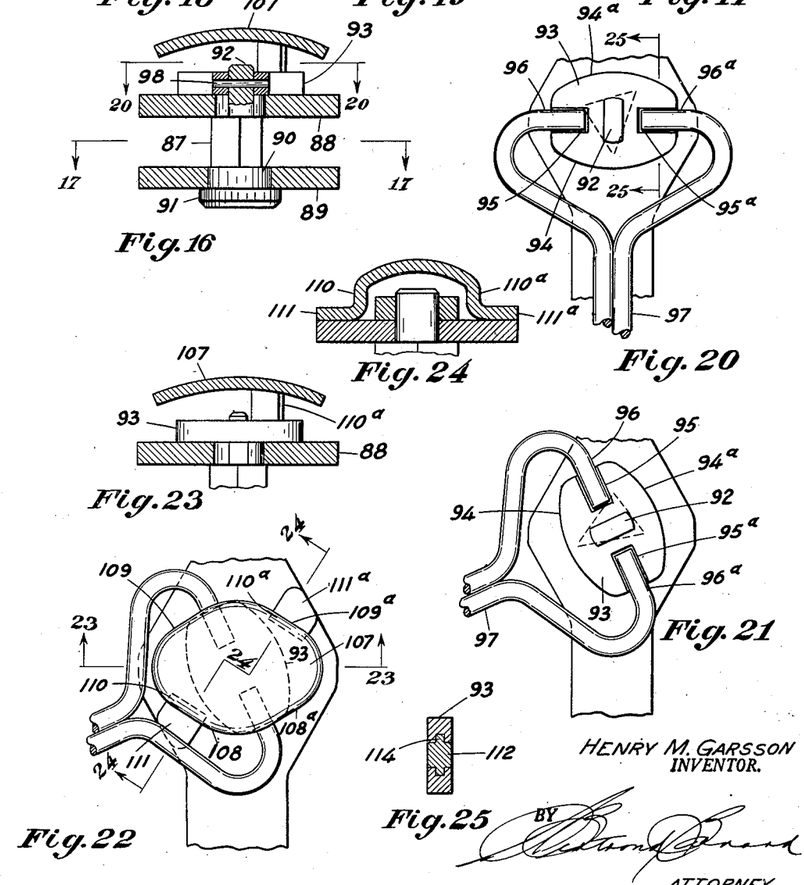
Fig. 16 is a cross-section, similar to Fig. 5, through a modification of the slider construction, shown in Fig. 1, fitted with a triangular locking wedge, the support sections of which are fitted through the upper and lower channel plates, a locking wedge control plate being attached to the upper end of the locking wedge retaining section, with a cap mounted above the control plate, taken at 16—16, Fig. 17.
Fig. 20 is a plan view of the locking wedge control plate of the slider, shown in Fig. 16, attached to the locking wedge retaining section, with the prongs of a key fitted to the control plate slots, showing the position of the control plate and the locking wedge, when the locking wedge is in its operating position, shown in Fig. 18.
Fig. 21 is a plan view, similar to Fig. 20, of the control plate, shown in Fig. 20, with the control plate and the lock-wedge rotated into the locking position, similar to that shown in Fig. 19.
Fig. 22 is a plan view of the slider, shown in Figs. 16 and 21, showing the cap, which covers the locking wedge control plate and the cap support legs and the flanges thereof attached to the upper channel plate, the cap legs acting as stops to limit the angular movement of the control plate, when it is rotated into the locking wedge locking position.
Fig. 23 is a vertical section through the upper channel plate, the control plate, and the cap shown in Fig. 22, showing the relation between the control plate and the cap, when the control plate is in the locking wedge operating position, taken at 23—23, Fig. 22.
Fig. 24 is a vertical section through the cap and the upper channel plate, shown in Figs. 22 and 23, showing the legs supporting the cap, and the cap flanges, attached to the upper channel plate.
Fig. 25 is a cross-section through a portion of the locking wedge control plate, shown in Fig. 20, and one of the prongs of the key fitted thereto, showing one cross-sectional configuration of the key prong and the mating key slot in the control plate to identify a particular key with its mating control plate, taken at 25—25, Fig. 20.

As indicated in section, Fig. 16, the triangular locking wedge 87 is integral with a cylindrical pilot 90, which is trunnioned in the lower channel plate, a head 91, integral with the locking wedge pilot, retaining the locking wedge in alignment with the lower channel plate 89.

A parallel-faced retaining section 92, integral with the upper end of the locking wedge 87, projects through an opening in the upper channel plate 88, beyond the upper face thereof.

A locking wedge control plate 93, having a parallel-faced opening therethrough, conforming to the cross-sectional contour of the retaining section 92 of the locking wedge, is fitted to the retaining section 92 in alignment with the upper face of the upper channel plate 88.

The control plate 93, in the form of a flat plate, is of oval cross-section, the forward and rear longitudinal edges 94 and 94a thereof being of arcuate contour, as indicated in Fig. 20. A pair of substantially rectangular slots 95 and 95a is cut through the ends of the control plate 93 along the longitudinal axis thereof, the slots 95 and 95a receiving and supporting the prongs 96 and 96a of a key 97, utilized to rotate the control plate in order to move the triangular locking wedge 87 from the operating position, shown in Fig. 18, to the slide fastener element locking position, shown in Fig. 19. The arcuate forward and rear edges of the control plate 93 tend to guide the ends of the prongs 96 and 96a of the key toward the slots 95 and 95a in the control plate, in the position shown in Fig. 20.

A pin 98, inserted through the central section of the control plate, between the slots 95 and 95a, as indicated in Fig. 16, fits through the retaining section 92 of the locking wedge to maintain the vertical alignment between the control plate 93 and the locking wedge 87. As indicated in Figs. 18 and 19, the angle between the left and right-hand lower angular faces 99 and 100, of the triangular locking wedge, Fig. 18, is considerably smaller than that between the upper face 101 and the right-hand angular face 100, to clear the slide fastener elements in the operating position, Fig. 18, and to enable the lower angular faces, Fig. 18, to lodge between adjacent left-hand slide fastener elements 102, when the locking wedge is rotated into the locking position, shown in Fig. 19.

Figure 18:
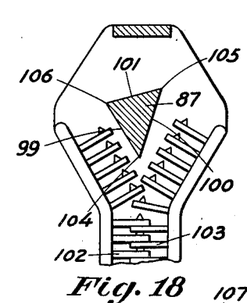
Fig. 18 is a schematic cross-section, similar to Fig. 1, through the triangular locking wedge, shown in Figs. 16 and 17, and a plan view of the slide fastener elements and the lower channel plate, showing the locking wedge in its operating position to clear the slide fastener elements.

The angle between the upper face 101 and the right-hand angular face 100 of the triangular locking wedge, Fig. 18, is somewhat greater than the angle between the two lower angular faces 99 and 100, Fig. 18, to enable the faces 100 and 101 to lodge between adjacent right-hand slide fastener elements 103, when the triangular locking wedge 87 is rotated into the slide fastener element locking position, shown in Fig. 19.

The angle between the upper face 100 and the left-hand angular face 99, Fig. 18, is greater than that at the right-hand upper corner, Fig. 18, to enable the left-hand upper corner between the faces 99 and 101, to lodge between adjacent left-hand slide fastener elements 102, when the locking wedge is rotated into the slide fastener element locking position in a direction opposite that shown in Fig. 19.

As indicated in Fig. 18, the triangular locking wedge 87, in its normal operating position, is mounted between two rows of slide fastener elements 102 and 103, which are guided into the angular positions, shown in Fig. 18, by the sloping section of the flanges integral with each of the channel plates 88 and 89 in the same manner as those shown in Fig. 1.

In the triangular locking wedge construction, shown in Figs. 18 and 19, the lower and upper corners 104 and 105 of the right-hand side of the triangular locking wedge 87, which are shown at the bottom of the locking wedge, when it is rotated into the slide fastener element locking position, shown in Fig. 19, lodge between adjacent slide fastener elements 102 and 103 at both sides of the channel plates, thereby positively restraining any movement of the slider relative to the slide fastener elements. The left-hand lower corner 104 of the locking wedge, Fig. 19, lodges between adjacent left-hand slide fastener elements 102a and 102b, thereby angularly displacing the slide fastener elements from their normal position relative to the tape, and restraining any movement of the slider relative to the slide fastener elements, until the triangular locking wedge is restored to its operating position, shown in Fig. 18, the left and right-hand lower faces 99 and 100, Fig. 18, of the triangular locking wedge, engaging the upper and lower adjacent slide fastener elements 102a and 102b, thereby angularly displacing the slide fastener elements relative to the tape in substantially the same manner as those shown in Fig. 2 and hereinbefore described.

At the same time, the lower right-hand corner 105, Fig. 19, of the triangular locking wedge 87, ledges between adjacent right-hand slide fastener elements 103a and 103b, the bottom and right-hand angular faces 100 and 101, respectively, of the triangular locking wedge in the locking position, shown in Fig. 19, lodging between adjacent right-hand slide fastener elements 103a and 103b, thereby angularly displacing the adjacent slide fastener elements 103a and 103b from their normal position substantially perpendicular to the tape, and in that manner assisting in positively locking the slider relative to the slide fastener elements in substantially the same manner as the double-tipped locking wedge 36, shown in Figs. 1, 2 and 3.

The triangular locking wedge may be rotated in a direction opposite that shown in the drawings, Fig. 19, in going from the operating position, Fig. 18, to one locking position, Fig. 19, the locking wedge locking characteristics functioning in substantially the same manner, as the radial distance from the pivot point at the center of the locking wedge and the corners 104, 105 and 106 of the triangular locking wedge 87 are substantially equal.

When rotated in the opposite direction, the upper left-hand corner 106 of the locking wedge, Fig. 18, lodges between adjacent left-hand slide fastener elements 102, the bottom corner 104, Fig. 18, lodging between adjacent right-hand slide fastener elements 103, thereby preventing the forward or rearward movement of the slider, relative to the slide fastener elements in the same manner as the locking wedge corner locking positions, shown in Fig. 19, and hereinbefore described.

Instead of the integral construction, shown in Fig. 16, the triangular locking wedge may be rotatably mounted on a cylindrical vertical shaft 39 or 54, such as those shown in Figs. 3 and 4, the locking wedge being integral with the locking wedge support member, as shown in Fig. 3, or attached thereto, in the manner shown in Fig. 4.

A control plate, similar to that shown in Fig. 20, but of substantially circular outer contour, would be attached to the upper end of the locking wedge support member, the prongs of a key being fitted to slots or openings in the sides of the control plate in substantially the same manner as that shown in Fig. 20.

With this type of locking wedge construction, a cap integral with the central cylindrical shaft 39 or 54, such as those shown in Figs. 3 and 4, would be substituted in place of the cover, shown in Figs. 22 and 24, the cap being of a larger diameter than those shown in Figs. 3 and 4 to cover the control plate attached to the locking wedge support member.

As indicated in Figs. 16, 22 and 23, a cover 107, the body of which is of arcuate cross-section, is mounted above the locking wedge control plate 93. As indicated in Fig. 22, the cover 107 is of oval contour, the sloping forward and rear edges 108, 108a and 109, 109a, respectively, substantially covering the ends of the control plate 93, when it is rotated into the fastener element locking position, shown in Fig. 19, in which the control plate 93 assumes the angular position, shown in Fig. 22.

As indicated in Fig. 24, the cover 107 has a pair of integral, substantially vertical legs 110 and 110a depending from the sloping forward and rear edges 108 and 109a, thereof, respectively, the legs 110 and 110a being located in such a radial position as to clear the arcuate longitudinal edges 94 and 94a of the control plate, to enable the control plate 93 to be rotated from the locking wedge operating position, shown in Fig. 20, to the slide fastener element locking position, shown in Figs. 21 and 22, the legs 110 and 110a of the cover 107 acting as stops to limit the angular movement of the control plate 93.

As indicated in Figs. 22 and 24, a pair of flanges 111 and 111a are formed integral with the lower end of the cover legs 110 and 110a, respectively, and substantially perpendicular thereto, adjacent the upper face of the upper channel plate 88, the flanges 111 and 111a being spot welded, brazed, or otherwise attached to the upper channel plate to support the cover, the legs 110 and 110a thereof vertically locating the cover in its proper position, relative to the control plate 93, so that the bottom edges of the cover body clear the control plate 93, to enable the control plate to be rotated from the locking wedge operating position, shown in Fig. 20, to the locking wedge slide fastener element locking position, shown in Fig. 22.

In place of the control plate 93 of oval contour, shown in Figs. 20, 21 and 22, a control plate of substantially circular outer contour may be substituted, the rectangular slots similar to the slots 95 and 95a, being cut through the horizontal center of the control plate, in substantially the same relative position as those shown in Fig. 20.

With a circular control plate, the vertical legs 110 and 110a, supporting the body of the circular cover covering it, would be somewhat wider than those shown in Fig. 24 and would be located in a position closer to the vertical cover center line, Fig. 22, than the cover legs 110 and 110a, shown in Fig. 22.

The legs supporting a cover used in conjunction with a circular control plate would engage the prongs of a key, fitted to the slots in the control plate, thus limiting the angular movement of the control plate about the central shaft in substantially the same manner as the vertical legs 110 and 110a, shown in Figs. 22 and 24, and hereinbefore described.

With this type of cover and control plate construction, the control plate and the triangular locking wedge, to which it is attached, may be rotated either into the slide fastener element locking position, shown in Fig. 19, or in the opposite direction, the limiting angular movement being controlled by the position of the legs supporting the cover, which would be located substantially on the vertical cover center line, Fig. 22, and the angular movement required to rotate the triangular locking wedge into the fastener element locking position, which would be limited by the maximum angular movement permitted by the vertical cover legs, which engage the prongs of the key in the limiting angular position in both directions.

Where a cover 107, such as that shown in Figs. 16, 22 and 23 is utilized, the slider channel plates 77 and 78 would be constructed in the manner shown in Fig. 11, with an arcuate neck 80 connecting the upper and lower channel plates 77 and 78.

Where the type of cover, such as that shown in Figs. 22, and 24 is eliminated, a pair of spring type channel plates 20 and 21 may be substituted therefor, an integral arcuate connecting section 24 or 24a being formed between the rear end of each channel plate 20 and 21 and the connecting neck or web 22 located therebetween, in the same manner as that shown in Figs. 3 and 4 and hereinbefore described.

The prongs 96 and 96a of the key, shown in Figs. 20 and 21, would normally be of either circular cross-section or rounded at the sides, which engage the walls of the control plate slots 95 and 95a, to enable the legs of the key to be pivoted about the key prongs 96 and 96a, thereby permitting an operator to grip the key and manipulate the slider either rearward or forward relative to the slide fastener elements, to either interlock the slide fastener elements or disengage them in the normal manner.

Fig. 25 is a cross-section through a modification of the prongs of the key shown in Fig. 20. As indicated in Fig. 25, each key prong 112 is of substantially rectangular cross-section, the width of the key prong being slightly narrower than the width of the slots in the control plate 93. A pair of substantially rectangular tongues 114 are integral with the sides of each of the rectangular key prongs, the tongues fitting into similarly formed grooves cut into the side walls of the control plate, adjacent the longitudinal slots therethrough.

The cross-sectional contour of the key prong 112 and the corresponding slots 95 in the control plate may be varied considerably, by varying the cross-sectional contour of the key prongs and the corresponding slots in the control plate, by the use of tongues, such as those shown in Fig. 25, or by cutting grooves or channels in the key prongs to receive mating projections formed in the control plate slots. This serves to positively identify a key fitted with a particular configuration of prong with a control plate having slots therethrough of a mating configuration, thus requiring a particular key to move the triangular locking wedge of a slider fitted with a particular control plate from the locking position, shown in Fig. 19, to the operating position, shown in Fig. 18, to enable the slider to be moved in its normal manner, relative to the slide fastener elements, to disengage the slide fastener elements from their interlocked position. Where a key fitted with prongs having a cross-sectional contour such as that shown in Fig. 25 is employed, the legs of the key would be offset in a plane parallel to the upper channel plate of the slider to a level considerably higher than the level of the upper channel plate and the key prongs, thereby enabling an operator to grip the key and manipulate the slider in order to interlock or disengage the slide fastener elements in the usual manner.

With the slider channel plate construction shown in Figs. 3 and 4, the upper and lower channel plates 20 and 21, the neck 22 connecting the rear end thereof, and the arcuate connecting sections 24 and 24a between the neck and the individual channel plates are formed of a spring material, such as beryllium, copper, corrosion resistant steel, or a similar material, which is heat treated and tempered to obtain the desired spring tension.

When the slider channel plates are heat treated, they are adjusted so that the upper and lower channel plates 20 and 21 are substantially parallel to one another, as indicated in Fig. 3, and spaced from one another a distance greater than the height of the slide fastener elements 34 and 35, to enable the slider to be moved rearward or forward relative to the slide fastener elements to interlock or disengage the slide fastener elements.

In the normal operation, the locking wedge 36 is located in the operating position, shown in Fig. 1, or in the case of the triangular locking wedge 87 in the operating position, shown in Fig. 18, clear of the slide fastener elements.

In operating the slider, should any foreign matter be lodged between the mating fastener elements, or should the slide fastener elements become distorted, or mislocated for any reason, in such a manner as to jam the slide fastener elements, while the locking wedge is in the operating position, shown in Fig. 1, the spring action of the neck 22 connecting the upper and lower channel plates 20 and 21, and the arcuate connecting sections 24 and 24a thereof, will allow the forward end of the channel plates to separate, thereby angularly separating the upper and lower channel plates out of the parallel position, shown in Fig. 3. This enables the operator to readjust the relative positions of the slide fastener elements 34 and 35 into their operating position, after which the channel plates 20 and 21 would be restored to their normal operating position, shown in Fig. 3, so that the slider can be operated in its normal manner.

If any involved adjustment of the slide fastener elements is required, a wedge or screw driver may be inserted between the flanges 28 and 29 of the upper and lower channel plates 20 and 21, thereby retaining the channel plates in their canted position for a sustained period and allowing the operator to make the necessary slide fastener element adjustments.

When the operator desires to remove the slider from the slide fastener elements to replace it, or to make any major adjustments in the slide fastener elements, the tubular locking wedge support member 51 is rotated for several turns about the central vertical shaft 54, shown in Fig. 4, the external threads on the outer circumference of the tubular locking wedge support member angularly raising the upper channel plate 20 relative to the lower channel plate, into substantially the position shown in Fig. 4, the upper channel plate clearing the slide fastener elements 34 and 35 sufficiently to allow the slider to be removed from the slide fastener elements and a new slider substituted therefor, when the locking wedge 52 is in the operating position, shown in Fig. 1.

The operation of the unit, shown in Fig. 3, is substantially the same as that shown in Fig. 4, except that the locking wedge 36 is integral with the hollow locking wedge support member. In order to remove the slider shown in Fig. 3, from the slide fasteners elements, the locking wedge support member 37 is rotated through several turns until the upper channel plate 20 assumes the angular position, relative to the lower channel plate, shown in Fig. 4. The slider may then be readily removed from the slide fastener elements 34 and 35 and a new slider substituted therefor.

In the construction shown in Fig. 11, if the slide fastener elements became jammed for any reason, or if any foreign matter is introduced between the slide fastener elements, the locking wedge support shaft 76 may be rotated by means of a key, the prongs 82 and 82a of which are fitted to the head thereof, either through one or more full turns, or through one-half turn or multiples thereof, until the locking wedge 75 assumes the operating position, as shown in Fig. 1, or 180° therefrom. The threads on the outer circumference of the cylindrical support shaft angularly raise the upper channel plate 77 a short distance relative to the lower channel plate 78, thereby freeing the slide fastener elements and allowing the operator to make the necessary adjustments thereto, or to remove any foreign matter lodged therebetween. This frees the jammed slide fastener elements and allows the slider to be moved freely relative to the slide fastener elements, thus enabling the operator to remove any foreign matter lodged between the slide fastener elements and to readjust the slide fastener elements into their normal operating position, after which the upper channel plate 77 is again restored to its initial position by rotating the locking wedge support shaft in the opposite direction, until the channel plates 77 and 78 assume the parallel position, shown in Fig. 11.

When the operator desires to remove the slider from the fastener elements to replace it, or to make any major adjusments in the fastener elements, the locking wedge support shaft 76 is rotated through one or more turns, or half-turn multiples, until the upper channel plate 77 is raised to substantially the angular position, shown in Fig. 4, after which the slider may be removed from the slide fastener elements in the same manner as that shown in Fig. 4, and hereinbefore described.

In this manner, applicant's slider may be readily used as a replacement for the conventional type of slider for a slide fastener, by the simple expedient of removing the conventional type of slider from the slide fastener elements, spreading the open end of the slider channel plates 20 and 21 in the manner hereinbefore described, and moving the slider with the locking wedge fitted thereto into the operating position, relative to the slide fastener elements 34 and 35, shown in Fig. 1.

Where a triangular locking wedge, such as that shown in Fig. 18, is employed in conjunction with a tubular locking wedge support member, such as that shown in Figs. 3 and 4, the upper channel plate will be raised relative to the lower channel plate by the spring action of the slider channel plates and the neck connecting them, in the same manner as that shown in Figs. 3 and 4 and hereinbefore described.

In order to remove a slider of this type, equipped with a triangular locking wedge, from the slide fastener elements, the locking wedge is rotated through several turns, by rotating the locking wedge support member until the locking wedge is in the operating position, shown in Fig. 18, by means of a key. Where a tubular or a cylindrical locking wedge support member having external threads thereon, such as those shown in Figs. 3 and 4 are employed, the upper channel plate is angularly raised to substantially the position, shown in Fig. 4, relative to the lower channel plate, thus clearing the slide fastener elements by a sufficient margin to enable the slider to be removed therefrom, and a new slider substituted.

In the construction shown in Figs. 5 and 6, in which a latch spring 59 is fitted to a channel in the tubular locking wedge support member, the prongs of a key 63, such as that shown in Fig. 7 are inserted through openings in the walls of the tubular wedge support member, one prong 62 of the key moving the latch spring into the free position shown in Fig. 6.

With a construction of the type, shown in Figs. 5 and 6, one prong 62 of a key is inserted through the right-hand opening in the locking wedge support member 57, in order to free the latch spring 59, after which the tubular locking wedge support member 57 may be rotated through several turns or multiple one-half turns until the upper channel plate 20 assumes an angular position, relative to the lower channel plate, such as that shown in Fig. 4. This enables the slider to be removed from the slide fastener elements, when the locking wedge is in the operating position, shown in Fig. 1, or rotated 180° therefrom, thus allowing a new slider to be substituted in the same manner as the construction shown in Figs. 3 and 4, and hereinbefore described.

The operation of the locking wedge 36 in locking the slide fastener elements, in the locking wedge construction shown in Fig. 3 is performed by rotating the locking wedge 36 from the operating position, shown in Fig. 1, to the locking position, shown in Fig. 2, by rotating the wedge support member by means of a key, such as that shown in Fig. 7, or an alternate type of key such as that shown in Fig. 10, the tapered tips 48 and 49 of the locking wedge lodging between adjacent slide fastener elements, in the manner shown in Fig. 2 and hereinbefore described.

Where a tubular locking wedge support member, such as that shown in Fig. 4 is employed, the operation of rotating the locking wedge 52 into the locking position, shown in Fig. 2, is performed in substantially the same manner, a key, the prongs of which have a configuration conforming to the openings in the walls of the locking wedge support member head being inserted in said openings, after which the locking wedge 52 may be readily rotated into the fastener element locking position, shown in Fig. 2.

Where a locking wedge support member 57 fitted with a latch spring, such as that shown in Figs. 5 and 6 is employed, the prong 62 of a key is inserted into an opening in one wall of the tubular locking wedge support member 57 to move the latch spring into the free position, shown in Fig. 6, after which the locking wedge may be rotated into the locking position, shown in Fig. 2, in the same manner as those shown in Figs. 3 and 4 and hereinbefore described.

Where a triangular locking wedge, such as that shown in Figs. 18 and 19 is employed in conjunction with a locking wedge support member, such as those shown in Figs. 3 and 4, the locking wedge may be rotated into the slide fastener element locking position, shown in Fig. 19, in the same manner as those shown in Figs. 3 and 4 and hereinbefore described.

Where a triangular locking wedge is mounted on a tubular wedge support member, fitted with a latch spring, such as that shown in Figs. 5 and 6, the locking wedge may be rotated from the operating position shown in Fig. 18, to the locking position, shown in Fig. 19, by means of a key in the same manner as those shown in Figs. 5 and 6 and hereinbefore described.

With this type of triangular locking wedge construction, the triangular locking wedge may be rotated from the operating position, shown in Fig. 18, into the locking position, shown in Fig. 19, or into a reverse locking position in the manner hereinbefore described, the locking action of the corners of the locking wedge and the angular faces thereof with relation to the adjacent slide fastener elements being as hereinbefore described.

With a triangular locking wedge 87, such as that shown in Fig. 16, fitted with a cover 107, such as that shown in Figs. 22 and 23, the locking wedge may be rotated from the operating position, shown in Fig. 18 to the locking position, shown in Fig. 19, by means of a key fitted to the slots in the control plate 93.

With this type of cover eliminated, and another type of cap or cover substituted therefor, the triangular locking wedge 87, may be rotated either into the fastener element locking position, shown in Fig. 19, or into a reversed locking position, the action of the corners of the locking wedge and the angular faces thereof in locking the slide fastener elements relative to the slider being similar to that shown in Fig. 19 and hereinbefore described.

The channel plates may be constructed in the manner shown in Figs. 3 and 4, with an integral neck and an arcuate connecting section between the neck and the upper and lower channel plates, or the arcuate connecting sections may be eliminated, in the manner shown in Fig. 11.

The channel plates may be formed of a single sheet of spring material, heat threaded and tempered to the contour shown in Figs. 3 and 4, or it may be formed of another type of sheet material, in accordance with the construction shown in Figs. 11 and 12, the selection depending upon the type of locking wedge and the locking wedge support member used with the channel plates, and the method of fitting the locking wedge support member to the channel plates.

The operation of the locking wedge 36 integral with the wedge support member, shown in Fig. 3, and the locking wedge 52 attached to the locking wedge support member, shown in Fig. 4, are essentially the same from the standpoint of locking the slider relative to the two rows of interlocking slide fastener elements.

The variations in construction between the two types of locking wedge and locking wedge support member, shown in Figs. 3 and 4, are designed primarily to reduce the cost of the various parts and to facilitate assembly of the locking wedge and the wedge support member employed in combination therewith, to the channel plates.

The operation of the locking wedge shown in Fig. 11, with the locking wedge 75 attached to the wedge support member shaft, is essentially the same as those shown in Figs. 3 and 4, from the standpoint of locking the slider relative to the two rows of interlocking slide fastener elements.

The locking wedge construction, shown in Figs. 3, 4 and 11, employing a locking wedge having diametrically opposite tapered tips, may be used in conjunction with a triangular prismatic locking wedge, such as that shown in Fig. 16, where the locking wedge is attached to and supported by the locking wedge support member, in the various combinations shown in Figs. 3, 4 and 11. The only essential difference between the two types of locking wedge construction is the difference in the angular movement of the locking wedge from the operating position, shown in Fig. 1, to the slide fastener element locking position, Fig. 2, and from the operating position of the triangular locking wedge, as shown in Fig. 18 to one of the slide fastener element locking positions, shown in Fig. 19.

The key construction shown in Figs. 9 and 10, may be employed interchangeably with the key construction, shown in Fig. 7, where the sizes of the prongs of the respective key fit into the corresponding diametral openings in the locking wedge support member, or the head of the locking wedge support member.

Where a key prongs having a cross-sectional configuration such as that shown in Figs. 13 and 15 is used, the diametral openings in the locking wedge support member, or in the head thereof, would conform to the cross-sectional configuration of the corresponding key prongs, any number of combinations of configuration of key prong cross-section, and locking wedge support member opening being available to identify a particular contour of key prong with a particular locking wedge support member.

It will be apparent to those skilled in the art that my present invention is not limited to the specific details described above and shown in the drawings, and that various further modifications are possible in carrying out the features of the invention and the operation, method of attachment, actuation, and the method of utilization thereof, without departing from the spirit and scope of the appended claims.

What I claim is:

1. A slider for use in combination with two rows of interlocking slide fastener elements, comprising a pair of channel plates, means connecting one end of said channel plates, said channel plates being located in spaced relation to one another, each of said channel plates having integral flanges, which are operative and located to slidably engage and interlock the mating slide fastener elements when the slider is moved longitudinally rearwardly relative to the slide fastener elements, a portion of each of said channel plate flanges sloping outward from the longitudinal channel plate axis, a tubular locking wedge support member threadably fitted to one channel plate extending toward the second channel plate, the tubular locking wedge support member being located between the sloping sections of the channel plate flanges, the end of the locking wedge support member located adjacent the first channel plate having a sloping channel cut into the interior thereof, a substantially cylindrical element attached to the second channel plate fitted to the interior of the tubular wedge support member, a plate spring fixedly attached to the cylindrical element, a portion of said plate spring being operative to fit into the tubular wedge support member channel to prevent rotation of the tubular wedge support member, a locking wedge having a plurality of integral tapered tips fixed to the locking wedge support member, between the channel plates, said locking wedge tapered tips being operative to lodge between adjacent slide fastener elements to prevent longitudinal movement of the slider relative to the slide fastener elements in one locking wedge angular position, said tubular wedge support member having a pair of aligned openings therethrough, one of said openings being in communication with the tubular wedge support member channel, and a key having a pair of aligned prongs removably fitted to the tubular wedge support member openings, the cross-sectional contour of the tubular wedge support member openings conforming to the cross-section of the key prongs, one of the key prongs being operative to press the plate spring out of engagement with the tubular wedge support member, said key being operative to rotate the locking wedge from a position free of the slide fastener elements to a position in which the tapered locking wedge tips lodge between adjacent slide fastener elements.

2. A slider for use in combination with two rows of interlocking slide fastener elements, comprising an upper and a lower channel plate, means connecting one end of said channel plates, said channel plates having integral flange means, which are operative and located to slidably engage and interlock the mating slide fastener elements when the slider is moved longitudinally rearwardly relative to the slide fastener elements, a tubular locking wedge support member threadably fitted to the upper channel plate extending toward the lower channel plate, the upper end of said locking wedge support member having a sloping channel cut into the interior thereof, a cylindrical shaft attached to the lower channel plate fitted to the interior of the tubular locking wedge support member, a portion of the cylindrical shaft being cut away to form a flat surface thereon, a plate spring attached to the flat surface of the cylindrical shaft, a portion of said plate spring being operative to fit into the tubular wedge support member channel to prevent rotation of the tubular wedge support member, a locking wedge having a plurality of tapered tips fixed to the tubular wedge support member between the upper and lower channel plates, said locking wedge being located between the two rows of slide fastener elements in their disengaged position, the tapered tips of said locking wedge being operative to lodge between adjacent slide fastener elements at opposite sides thereof to prevent longitudinal movement of the slider relative to the slide fastener elements in one locking member angular position, said tubular wedge support member having a pair of aligned openings therethrough, one of said openings being in communication with the tubular wedge support member channel, and a key having a pair of aligned prongs removably fitted to the tubular locking wedge support member openings, said key being operative to rotate the locking wedge from a position with the tapered tips thereof free of the slide fastener elements, to a position in which the locking wedge tapered tips lodge between adjacent slide fastener elements.

3. A slider for use in combination with two rows of interlocking slide fastener elements, comprising an upper and a lower channel plate, formed of a single piece of spring sheet material, integral spring means connecting one end of said channel plates, said channel plates being located in spaced relation to one another, said channel plates having integral flange means, which are operative and located to slidably engage and interlock the mating slide fastener elements when the slider is moved longitudinally rearwardly relative to the slide fastener elements, a tubular locking wedge support member threadably fitted to the upper channel plate extending toward the lower channel plate, the upper end of said locking wedge support member having a sloping channel cut into the interior thereof, a cylindrical shaft attached to the lower channel plate fitted to the interior of the tubular wedge support member, spring means attached to the cylindrical shaft, a portion of said spring means being adjusted to fit into the tubular wedge support member channel to prevent rotation of the tubular wedge support member, a locking wedge fixed to the tubular wedge support member between the upper and lower channel plates, said locking wedge being located between the two rows of slide fastener elements in their disengaged position, said locking wedge being operative to lodge between adjacent slide fastener elements at opposite sides thereof to prevent longitudinal movement of the slider relative to the slide fastener elements in one locking wedge angular position, said tubular wedge support member having aligned diametral openings therethrough, one of said openings being in communication with the tubular wedge support member channel, a key having a pair of aligned prongs removably fitted to the tubular support member openings, one of the key prongs being operative to press the spring means out of engagement with the tubular wedge support member, said key being operative to rotate the tubular wedge support member with the locking wedge fixed thereto.

4. A slider for use in combination with two rows of interlocking slide fastener elements, comprising an upper and a lower channel plate, means connecting one end of said channel plates, said channel plates being located in spaced relation to one another, said channel plates having integral flange means, which are operative and located to slidably engage and interlock the mating slide fastener elements when the slider is moved longitudinally rearwardly relative to the slide fastener elements, a tubular locking wedge support member threadably fitted to the upper channel plate extending toward the lower channel plate, one end of said locking wedge support member having a spring receiving channel cut into the interior thereof, a cylindrical shaft attached to the lower channel plate fitted to the tubular wedge support member interior, a latch spring attached to the cylindrical shaft in operative alignment with the tubular wedge support member channel, a portion of said latch spring being operative to fit into the tubular wedge support member channel to prevent rotation of the tubular support member, a locking wedge having a plurality of tapered tips fixed to the tubular wedge support member between the upper and lower channel plates, said locking wedge being located between the two rows of slide fastener elements in their disengaged position, the tapered locking wedge tips being operative to lodge between adjacent slide fastener elements to prevent longitudinal movement of the slider relative to the slide fastener elements in one locking wedge angular position, said tubular wedge support member having aligned diametral openings therethrough, one of said openings being in communication with the tubular wedge support member channel, a key formed of a spring material having a pair of aligned prongs removably fitted to the tubular wedge support member openings, one of the key prongs being fitted to the wedge support member opening in the communication with the spring receiving channel to press the latch spring out of engagement with the tubular wedge support member, said key being operative to rotate the tubular support member with the locking wedge fixed thereto.

5. A slider for use in combination with two rows of interlocking slide fastener elements, comprising an upper and a lower channel plate, means connecting one end of said channel plates, said channel plates being located in spaced relation to one another, each of said channel plates having integral flanges, which are operative and located to slidably engage and interlock the mating slide fastener elements when the slider is moved longitudinally rearwardly relative to the slide fastener elements, a substantially tubular locking wedge support member threadably fitted to the upper channel plate extending toward the lower channel plate, one end of said locking wedge support member having a spring-receiving channel of rectangular cross-section cut into the interior thereof, a cylindrical shaft fitted to the interior of the locking wedge support member, one end of said cylindrical shaft being attached to the lower channel plate, a plate spring attached to the cylindrical shaft in operative alignment with the spring-receiving channel, a portion of said plate spring being operative to fit into the spring-receiving channel to prevent rotation of the tubular wedge support member, a locking wedge having a plurality of integral tapered tips attached to the locking wedge support member, the locking wedge being located between the two rows of slide fastener elements in their disengaged position, said locking wedge tapered tips being operative to lodge between adjacent slide fastener elements to prevent longitudinal movement of the slider relative to the slide fastener elements in one locking wedge angular position, said wedge support member having a pair of aligned diametral openings therethrough substantially perpendicular to the longitudinal wedge support member axis, one of said openings extending into the spring-receiving channel, and a key having a pair of aligned prongs removably fitted to the tubular wedge support member openings, one of the key prongs being fitted to the tubular wedge support member opening extending into the spring-receiving channel to press the plate spring out of engagement with the tubular wedge support member, said key being operative to rotate the tubular wedge support member and the attached locking wedge from a position free of the slide fastener elements to a position in which the tapered locking wedge tips lodge between adjacent slide fastener elements.

6. A slider for use in combination with two rows of interlocking slide fastener elements, comprising an upper and a lower channel plate formed of a sheet material, an integral neck connecting one end of said channel plates, said channel plates being located in spaced relation to one another, said channel plates having integral flanges, which are operative and located to slidably engage and interlock the mating slide fastener elements when the slider is moved longitudinally rearwardly relative to the slide fastener elements, a substantially tubular locking wedge support member threadably fitted to the upper channel plate extending toward the lower channel plate, a cylindrical shaft fitted to the interior of the tubular wedge support member, a reduced diameter extension of said cylindrical shaft being attached to the lower channel plate, a cap integral with the cylindrical shaft adjacent the top of the tubular locking wedge support member, a locking wedge operative to lodge between adjacent slide fastener elements at opposite sides thereof to prevent longitudinal movement of the slider relative to the slide fastener elements attached to the locking wedge support member, said locking wedge being mounted between the channel plates and located between the two rows of slide fastener elements in their disengaged position, said locking wedge support member having a pair of aligned diametral openings therethrough, substantially perpendicular to the longitudinal wedge support member axis, and a key having a pair of integral aligned prongs removably fitted to the tubular wedge support member openings, said key being operative to rotate the locking wedge from a position free of the slide fastener elements to a position in which the locking wedge lodges between adjacent slide fastener elements, the threaded portion of the tubular wedge support member in engagement with the upper channel plate being operative to move the upper channel plate out of parallelism with the lower channel plate to permit removal of the slider from the slide fastener elements when the tubular locking wedge support member is rotated in a direction opposite the slide fastener element locking direction.

7. A slider for use in combination with two rows of interlocking slide fastener elements, comprising an upper and a lower channel plate formed of a sheet spring material, an integral spring neck connecting one end of said channel plates, an integral connecting section of arcuate cross-sectional contour located between the neck and each channel plate, said channel plates being located in spaced relation to one another and maintained in said relation by the spring action of the integral neck and the arcuate connecting sections, said channel plates having integral flange means, which are operative and located to slidably engage and interlock the mating slide fastener elements when the slider is moved longitudinally rearwardly, relative to the slide fastener elements, a tubular locking wedge support member rotatably fitted to the upper channel plate extending toward the lower channel plate, one end of said locking wedge support member having a channel of rectangular cross-section cut into the interior thereof, a cylindrical shaft attached to the lower channel plate fitted to the interior of the tubular wedge support member, a plate spring attached to the cylindrical shaft in operative alignment with the tubular wedge support member channel, a portion of said plate spring being operative to fit into the tubular support member channel to prevent rotation of the tubular wedge support member, a locking wedge operative to lodge between adjacent slide fastener elements at opposite sides thereof to prevent longitudinal movement of the slider relative to the slide fastener elements attached to the locking wedge support member, the locking wedge being located between the two rows of slide fastener elements in their disengaged position, one end of the locking wedge support member, adjacent the upper channel plate, having a pair of aligned openings therethrough in a direction perpendicular to the longitudinal wedge support member axis, one of said openings being in direct communication with the tubular wedge support member channel, and a spring key having a pair of aligned prongs removably fitted to the locking wedge support member openings, one of the key prongs being operative to press the plate spring out of engagement with the tubular locking wedge support member, said key being operative to rotate the locking wedge from a position clear of the slide fastener elements to a position in which the locking wedge lodges between adjacent slide fastener elements.

8. A slider for use in combination with two rows of interlocking slide fastener elements, comprising an upper and a lower channel plate, means connecting one end of said channel plates, said channel plates being located in spaced relation to one another, each of said channel plates having integral flanges, which are operative and located to slidably engage and interlock the mating slide fastener elements when the slider is moved longitudinally rearwardly relative to the slide fastener elements, a portion of each of said channel plate flanges sloping outward from the longitudinal channel plate axis, a tubular locking wedge support member threadably fitted to the upper channel plate extending toward the lower channel plate, a substantially cylindrical shaft attached to the lower channel plate rotatably locating the cylindrical locking wedge support member, said cylindrical shaft having a cap integral therewith, adjacent the upper end of the tubular locking wedge support member, a locking wedge having a plurality of integral tapered tips fixed to the locking wedge support member, said locking wedge being mounted between the channel plates and located between the sloping sections of the channel plate flanges, said locking wedge tapered tips being operative to lodge between adjacent slide fastener elements to prevent longitudinal movement of the slider relative to the slide fastener elements in one locking wedge angular position, one end of the locking wedge support member adjacent the upper channel plate having a pair of aligned openings therethrough in a direction perpendicular to the longitudinal axis thereof, and a key formed of a spring material having a pair of aligned prongs adjusted to removably fit to the wedge support member, said key having a control slide fitted thereto, operative to retain the key prongs in the wedge support member openings, said key being operative to rotate the locking wedge, the threaded portion of the tubular locking wedge support member in engagement with the upper channel plate being operative to angularly separate the upper and lower channel plates to permit removal of the slider from the slide fastener elements when the tubular locking wedge support member is rotated in one direction.

9. A slider for use in combination with two rows of interlocking slide fastener elements, comprising an upper and a lower channel plate formed of a single piece of spring material, an integral spring neck connecting one end of said channel plates, an integral connecting section of arcuate cross-sectional contour located between the neck and each channel plate, said channel plates having integral flange means, which are operative and located to slidably engage and interlock the mating slide fastener elements when the slider is moved longitudinally rearwardly relative to the slide fastener elements, a tubular locking wedge support member threadably fitted to the upper channel plate extending toward the lower channel plate, the upper end of said locking wedge support member having a sloping channel cut into the interior thereof, a cylindrical shaft attached to the lower channel plate fitted to the tubular wedge support member interior said cylindrical shaft having a cutout therein in operative alignment with the tubular wedge support member channel, a latch spring attached to the cylindrical shaft, a portion of said latch spring being adjusted to fit into the tubular wedge support member channel to prevent rotation of the tubular wedge support member, a locking wedge fixed to the tubular wedge support member between the upper and lower channel plates, said locking wedge being located between the two rows of slide fastener elements in their disengaged position, said locking wedge being operative to lodge between adjacent slide fastener elements to prevent longitudinal movement of the slider relative to the slide fastener elements in one locking wedge angular position, said tubular wedge support member having aligned diametral openings therethrough, one of said diametral openings being in communication with the tubular wedge support member channel, a key having a pair of integral prongs removably fitted to the tubular wedge support member diametral openings, one of the key prongs being operative to press the latch spring out of engagement with the tubular wedge support member, said key being operative to rotate the tubular wedge support member with the locking wedge fixed thereto.

10. A slider for use in combination with two rows of interlocking slide fastener elements, comprising an upper and a lower channel plate, means connecting one end of said channel plates, said channel plates being located in spaced relation to one another, each of said channel plates having integral flanges, which are operative and located to slidably engage and interlock the mating slide fastener elements when the slider is moved longitudinally rearwardly relative to the slide fastener elements, a locking wedge of triangular cross-section rotatably mounted between the channel plates, said locking wedge being located between the two rows of slide fastener elements in their disengaged position, a substantially cylindrical pilot integral with the lower end of the locking wedge trunnioned in the lower channel plate, the corners of said triangular locking wedge being operative to lodge between adjacent slide fastener elements to prevent longitudinal movement of the slider relative to the slide fastener elements, when the locking wedge is rotated into a slide fastener element locking position, said locking wedge having an extension integral therewith projecting through the upper channel plate, a control member attached to the locking wedge extension adjacent the upper channel plate, a key having a pair of aligned prongs removably fitted to the locking wedge control member, said control member having means formed therein operative to removably receive the key prongs, a cover fixedly attached to the upper channel plate adjacent the control member, said cover having a pair of integral legs to support the cover clear of the control member, the cover legs being operative to engage the key prongs to limit the angular movement of the control member said key being operative to rotate the triangular locking wedge from a position free of the slide fastener elements to a position in which two corners of said locking wedge lodge between adjacent slide fastener elements.

11. A slider for use in combination with two rows of interlocking slide fastener elements, comprising an upper and a lower channel plate, means connecting one end of said channel plates, said channel plates being located in spaced relation to one another, each of said channel plates having integral flanges, which are operative and located to slidably engage and interlock the mating slide fastener elements when the slider is moved longitudinally rearwardly relative to the slide fastener elements, a triangular prismatic locking wedge rotatably mounted between the upper and lower channel plates, said locking wedge being located between the two rows of slide fastener elements in their disengaged position, a substantially cylindrical pilot integral with the lower end of the locking wedge trunnioned in the lower channel plate, the corners of said triangular locking wedge at opposite sides thereof, being operative to lodge between adjacent slide fastener elements to prevent longitudinal movement of the slider relative to the slide fastener elements when the locking wedge is rotated into a slide fastener element locking position, said locking wedge having an extension integral with the upper end thereof, projecting through the upper channel plate, a control plate attached to the locking wedge extension adjacent the upper channel plate, the control plate having a pair of diametrically opposite key-receiving slots therethrough, and a key having a pair of integral aligned prongs adjusted to removably fit the locking wedge control plate slots, removably fitted to said control plate, a cover fitted to the upper channel plate adjacent the control plate, said cover having a pair of integral legs to support the cover clear of the control plate, and a flange integral with each of said cover legs, said flanges being fixedly attached to the upper channel plate, the cover legs being operative to engage the key prongs to limit the angular movement of the control plate, said key being operative to rotate the triangular locking wedge from a position free of the slide fastener elements to a position in which two corners of said locking wedge lodge between adjacent slide fastener elements.

12. A slider for use in combination with two rows of interlocking slide fastener elements, comprising an upper and a lower channel plate formed of a single piece of sheet material, an integral neck connecting one end of said channel plates, said channel plates being located in spaced relation to one another, each of said channel plates having integral flanges, which are operative and located to slidably engage and interlock the mating slide fastener elements when the slider is moved longitudinally rearwardly relative to the slide fastener elements, a locking wedge of triangular cross-section rotatably mounted between the channel plates, said locking wedge being located between the two rows of slide fastener elements in their disengaged position, a substantially cylindrical pilot integral with the lower end of the locking wedge trunnioned in the lower channel plate, two corners of said locking wedge at opposite sides thereof being operative to lodge between adjacent slide fastener elements to prevent longitudinal movement of the slider relative to the slide fastener elements when the locking wedge is rotated into a slide fastener element locking position, said locking wedge having an extension integral with the upper end thereof projecting through the upper channel plate, a control plate attached to the locking wedge extension adjacent the upper channel plate, the control plate having a pair of diametrically opposite slots therethrough, a key having a pair of integral aligned prongs adjusted to removably fit the locking wedge control plate slots, removably fitted to the control plate, a cover fitted to the upper channel plate mounted adjacent the control plate, said cover having a pair of integral legs to support the cover clear of the control plate, and a flange integral with each of said cover plate legs, said flanges being attached to the upper channel plate, the cover legs being positioned to engage the key prongs to limit the angular movement of the control plate, said key being operative to rotate the triangular locking wedge.

13. A slider for use in combination with two rows of interlocking slide fastener elements, comprising an upper and a lower channel plate, means connecting one end of said channel plates, said channel plates having integral flanges, which are operative and located to slidably engage and interlock the mating slide fastener elements when the slider is moved longitudinally rearwardly relative to the slide fastener elements, a tubular locking wedge support member threadably fitted to the upper channel plate extending toward the lower channel plate, a cylindrical shaft attached to the lower channel plate fitted to the tubular wedge support member interior, a cap integral with the end of the cylindrical shaft adjacent the top of the tubular wedge support member, a locking wedge having a plurality of tapered tips fixed to the tubular wedge support member between the upper and lower channel plates, said locking wedge being located between the two rows of slide fastener elements in their disengaged position, the tapered locking wedge tips being operative to lodge between adjacent slide fastener elements to prevent longitudinal movement of the slider relative to the slide fastener elements in one locking wedge angular position, said tubular wedge support member having aligned diametral openings therethrough, a key formed of a spring material having a pair of integral aligned prongs removably fitted to the tubular wedge support member, the key prongs being adjusted to removably fit the tubular wedge support member openings, said key being operative to rotate the tubular support member, the threaded portion of the tubular wedge support member in engagement with the upper channel plate being operative to angularly separate the upper and lower channel plate to permit removal of the slider from the slide fastener elements, when the tubular wedge support member is rotated in a direction opposite the slide fastener element locking direction.

14. A slider for use in combination with two rows of interlocking slide fastener elements, comprising an upper and a lower channel plate, an integral neck connecting one end of said channel plates, said channel plates having integral flanges, which are operative and located to slidably engage and interlock the mating slide fastener elements when the slider is moved longitudinally rearwardly relative to the slide fastener elements, a tubular locking wedge support member threadably fitted to the upper channel plate extending toward the lower channel plate, a cylindrical shaft attached to the lower channel plate, fitted to the tubular wedge support member interior, a cap integral with the end of the cylindrical shaft adjacent the top of the tubular wedge support member, a locking wedge having a plurality of integral tapered tips fixed to the tubular wedge support member between the upper and lower channel plates, said locking wedge being located between the two rows of slide fastener elements in their disengaged position, the tapered locking wedge tips being operative to lodge between adjacent slide fastener elements to prevent longitudinal movement of the slider relative to the slide fastener elements in one locking wedge angular position, said tubular wedge support member having aligned diametral openings therethrough, said diametral openings being of a distinctive cross-sectional contour, a key removably fitted to the tubular wedge support member diametral openings, said key having a pair of aligned prongs in a direction substantially perpendicular to the longitudinal key axis, the cross-sectional contour of the key prongs conforming to the wedge support member diametral openings, a pair of key legs integral with said prongs, said key legs being substantially parallel to one another when the key prongs are inserted in the tubular wedge support member diametral openings, integral spring means connecting the end of said key legs opposite the prongs, and means slidably fitted to said key legs operative to move the key prongs into the diametral wedge support member diametral openings, when the prongs are aligned with said openings, said key being operative to rotate the tubular wedge support member.

15. A slider for use in combination with two rows of interlocking slide fastener elements, comprising an upper and a lower channel plate formed of a single piece of spring sheet material, an integral spring neck connecting one end of said channel plates, said channel plates being located in spaced relation to one another and maintained in said relation by the spring action of the integral spring neck, said channel plates having integral flanges which are operative and located to slidably engage and interlock the mating slide fastener elements when the slider is moved longitudinally rearwardly relative to the slide fastener elements, a tubular locking wedge support member threadably fitted to the upper channel plate extending toward the lower channel plate, a cylindrical shaft attached to the lower channel plate fitted to the tubular wedge support member interior, a cylindrical cap integral with the end of the cylindrical shaft adjacent the tubular wedge support member top, a locking wedge fixed to the tubular wedge support member between the upper and lower channel plates, said locking wedge being located between the two rows of slide fastener elements in their disengaged position, said locking wedge being operative to lodge between adjacent slide fastener elements to prevent longitudinal movement of the slider relative to the slide fastener elements in one locking wedge angular position, said tubular wedge support member having aligned diametral openings therethrough, a key formed of a spring material having a pair of aligned prongs removably fitted to the tubular support member openings, said key prongs being adjusted to fit the wedge support member openings, with spring means integral with said key operative to maintain the key prongs within the support member openings, said key being operative to rotate the wedge support member with the locking wedge fixed thereto, the threaded portion of the tubular wedge support member in engagement with the upper channel plate being operative to angularly separate the upper and lower channel plates to permit removal of the slider from the slide fastener elements, when the tubular wedge support member is rotated in a direction opposite the slide fastener element locking direction.

References Cited in the file of this patent
UNITED STATES PATENTS

| | | |
|---|---|---|
| 2,068,502 | Marinsky | Jan. 19, 1937 |
| 2,157,084 | Rafael | May 2, 1939 |
| 2,530,438 | Modrey | Nov. 21, 1950 |
| 2,607,976 | Zahel | Aug. 26, 1952 |

FOREIGN PATENTS

| | | |
|---|---|---|
| 283,983 | Switzerland | of 1952 |
| 641,389 | France | of 1928 |